(12) United States Patent
Dinega

(10) Patent No.: US 8,338,522 B2
(45) Date of Patent: Dec. 25, 2012

(54) PROCESS OF MAKING POLYMER NANOCOMPOSITES

(75) Inventor: Dmitry P. Dinega, Midland, MI (US)

(73) Assignee: Dow Global Technologies LLC

( * ) Notice: Subject to any disclaimer, the term of this patent is extended or adjusted under 35 U.S.C. 154(b) by 727 days.

(21) Appl. No.: 12/504,237

(22) Filed: Jul. 16, 2009

(65) Prior Publication Data

US 2010/0012890 A1    Jan. 21, 2010

Related U.S. Application Data

(60) Provisional application No. 61/081,909, filed on Jul. 18, 2008.

(51) Int. Cl.
*C08K 3/34* (2006.01)
*C08K 9/02* (2006.01)
*C08K 9/04* (2006.01)

(52) U.S. Cl. ......... 524/445; 524/446; 524/447; 252/184

(58) Field of Classification Search .................. 524/446, 524/445, 447; 252/184
See application file for complete search history.

(56) References Cited

U.S. PATENT DOCUMENTS

| | | | |
|---|---|---|---|
| 5,102,948 A | 4/1992 | Deguchi et al. | |
| 5,962,553 A | 10/1999 | Ellsworth | |
| 6,156,835 A | 12/2000 | Anderson et al. | |
| 6,423,768 B1 | 7/2002 | Khouri | |
| 6,822,035 B2 | 11/2004 | Chaiko | |
| 2002/0143094 A1* | 10/2002 | Conroy et al. | 524/445 |
| 2005/0059769 A1* | 3/2005 | Chou et al. | 524/445 |
| 2007/0015853 A1 | 1/2007 | Weng et al. | |

FOREIGN PATENT DOCUMENTS

| | | |
|---|---|---|
| EP | 0398551 | 11/1995 |
| WO | 2007133763 | 11/2007 |

OTHER PUBLICATIONS

Hasegawa et al., "Nylon 6/Na-montmorillonite nanocomposites prepared by compounding Nylon 6 with Na-montmorillonite slurry," Polymer, 2003, pp. 2933-2937, vol. 44 No. 10, Elsevier Science Ltd.
Yu et al., "Water-Assisted Melt Compounding of Nylon-6/Pristine Montmorillonite Nanocomposites", Journal of Polymer Science: Part B: Polymer Physics, 2005, pp. 1100-1112, vol. 43.
Takeichi et al., "Polybenzoxazine/clay Hybrid Nanocomposites: Influence of Preparation Method on the Curing Behavior and Properties of Polybenzoxazines", Polymer, 2002, pp. 45-53, vol. 43, No. 1, Elsevier Science Ltd.
Kim et al., "Polymer Blend/Organoclay Nanocomposite with Poly(Ethylene Oxide) and Poly(Methyl Methacrylate)", European Polymer Journal, 2005, pp. 679-685, vol. 41 No. 4, Elsevier Ltd.
Morgan et al., "Exfoliated Polystyrene Clay Nanocomposites: Effect of Sonication on Solvent Blending", PMSE Preprints, 2005, pp. 412-413, vol. 92, The American Chemical Society.
Sun et al., "Preparation of Exfoliated Epoxy/α-Zirconium Phosphate Nanocomposites Containing High Aspect Ratio Nanoplatelets", Chem. Mater., 2007, pp. 1749-1754, vol. 19, The American Chemical Society.
Gray et al., "Composition and Properties of Oil Well Drilling Fluids", 1980, pp. 154-155, 4th Edition; Gulf Publish Company.

* cited by examiner

*Primary Examiner* — James J Seidleck
*Assistant Examiner* — Deve E Valdez

(57) ABSTRACT

The instant invention generally provides a process of making a polymer nanocomposite by compounding an organoclay and a melt of a polymer in the presence of water. The instant invention also provides a polymer nanocomposite made by the process.

17 Claims, 2 Drawing Sheets

PROCESS OF MAKING POLYMER NANOCOMPOSITES

CROSS-REFERENCES TO RELATED APPLICATIONS

This application claims benefit of priority from U.S. Provisional Patent Application No. 61/081,909 filed Jul. 18, 2008, which provisional application is hereby incorporated by reference in its entirety.

The present invention is in the field of polymer nanocomposites, more specifically, processes of making polymer nanocomposites from organoclays or organosalts and polymers and the polymer nanocomposites made by the processes.

BACKGROUND OF THE INVENTION

Conventional filled polymer composites are polymers filled with inorganic fillers (e.g., talc and calcium carbonate) that essentially act as economic fillers usually without improving physical or mechanical properties of the polymers. Nanocomposites comprised of polymers and clays (e.g., natural clays or synthetic organoclays) have been investigated, but these conventional clay nanocomposites are typically prepared by contacting together the polymers and either dry clay powders or an organic solvent-wet clay. Conventional clay nanocomposites wherein the polymer is hydrophobic usually contain clays that are poorly exfoliated (i.e., clays lacking dimensions less than 100 nanometers) and frequently agglomerated. Mechanical properties of such composites typically offer no or only minor improvement over mechanical properties of conventional filled polymers. Further, preparing such nanocomposites using methods that employ an organic solvent-wet clay lack sufficient safety and environmental benefits due to the flammability, explosiveness, toxicity, and waste treatment problems associated with the organic solvent.

Hasegawa N., et al. mention preparing a polymer nanocomposite from an inorganic clay, sodium montmorillonite (NaMMT), and the polymer, nylon-6, by compounding a water slurry of NaMMT with a melt of nylon-6 in an extruder (Hasegawa N., et al., Polymer, 2003;44(10):2933-2937).

Using a different method, Zhong-Zhen Y., et al. mention preparing another polymer nanocomposite from NaMMT and nylon-6, by compounding a powder of the NaMMT with a melt of nylon-6 in an extruder receiving a downstream injection of water (Zhong-Zhen Y., et al., Journal of Polymer Sci. Part B: Polymer Physics, 2005;43(9):1100-1112). Zhong-Zhen Y., et al. also mention preparing a composite from a melt of nylon-6 and a powder of an organoclay, OMMT—obtained by ion exchange of NaMMT with dioctadecyldimethylammonium cation—in an extruder receiving a downstream injection of water, but Zhong-Zhen Y., et al. also mention that this preparation did not favor exfoliation and dispersion of the organoclay. Zhong-Zhen Y., et al. also mention that adding water during melt compounding had little influence on mechanical properties of the resulting nylon-6/OMMT polymer nanocomposite compared to mechanical properties of a nylon-6/OMMT polymer nanocomposite prepared by an analogous process lacking injection of water.

European Patent Number EP 0 398 551 B1 mentions kneading nylon-6 with a dispersion medium and a water-wet organoclay, 12MMT, in an extruder. The 12MMT was obtained by exchanging more than 100% of an ion exchange capacity of a NaMMT with excess aqueous 12-ammonium-dodecanoic acid cations. In the process of EP 0 398 551 B1, a dispersion medium is required. For instance, Example 5 mentions using a 1:9 mixture of the 12MMT:water. Further, EP 0 398 551 B1 teaches that a minimum amount of the dispersion medium is necessary. For instance, Example 1 mentions successfully using a 1:9:9 mixture of 12MMT:water:$\epsilon$-caprolactam. Comparative Example 5 mentions that using less dispersion medium, particularly using a 1:0.25:0.25 mixture of 12MMT:water:$\epsilon$-caprolactam (i.e., the dispersion medium comprising 0.5 parts of a dispersion medium of 1:1 water:$\epsilon$-caprolactam), fails to give product.

Sun L., et al., *Preparation of Exfoliated Epoxy/$\alpha$-Zirconium Phosphate Nanocomposites Containing High Aspect Ratio Nanoplatelets*, Chem. Mater., 2007;19:1749-1754 mention an epoxy polymer nanocomposite comprising D.E.R. 332 epoxy resin (The Dow Chemical Company) cured with 4,4'-diaminodiphenyl sulfone and an organosalt comprising alpha-zirconium phosphate. The epoxy polymer nanocomposite is prepared by combining a mixture of the organosalt and acetone with the D.E.R. 332 epoxy monomer, sonicating, removing the acetone to give a dispersion of the organosalt in the monomer, adding the 4,4'-diaminodiphenyl sulfone, and curing the resulting mixture.

Polymer nanocomposites comprised of highly exfoliated organoclay or organosalt (i.e., organoclay or organosalt that is partially or fully delaminated such that at least 50% of particles thereof have at least one dimension that is less than 100 nanometers) and methods of preparing such polymer nanocomposites are needed. Compared to conventional filled polymer composites and conventional organoclay or organosalt nanocomposites, such polymer nanocomposites may provide one or more improved mechanical properties such as, for example, increased modulus (e.g., flexural modulus), lower density, improved optical clarity, lower coefficient of thermal expansion, in some instances increased impact toughness, or a combination thereof.

SUMMARY OF THE INVENTION

The instant invention generally provides a polymer nanocomposite and a process (invention process) of making the polymer nanocomposite. Preferably the invention polymer nanocomposite has substantially equivalent or better mechanical properties compared to a comparable polymer nanocomposite prepared using an organic solvent-wet organoclay, or has at least one improved mechanical property compared to a comparable polymer nanocomposite prepared by a process employing a dispersion medium or dry organoclay.

In a first embodiment, the instant invention is a process of making a polymer nanocomposite, the process comprising the steps of: exfoliatably contacting a melt comprising a polymer to a mixture comprising an organoclay or organosalt and a swelling liquid, wherein the swelling liquid comprises from 25 wt % to 95 wt % of the mixture and the swelling liquid comprises more than 90 weight percent (wt %) water and from 0 wt % to less than 10 wt % of a water-miscible organic solvent, to provide a distribution of the organoclay or organosalt in the melt; and cooling the distribution to provide a polymer nanocomposite comprising the organoclay or organosalt and the polymer, the organoclay or organosalt comprising a cation exchanging layered material, organic cations, and inorganic cations, the cation exchanging layered material having a cation exchanging capacity that is from 40 percent (%) to 99% exchanged with the organic cations, and the organoclay or organosalt, when distributed in the polymer, being exfoliated and having at least one dimension that is less than 100 nanometers (nm). Preferably, the swelling liquid is more than 99 wt % water, more preferably more than 99 wt % purified water, and still more preferably, lacks water-miscible organic solvent (not counting residual organic solvent that may carry through from preparation of a polymer or organoclay or organosalt useful in the present invention). Also preferably, the organoclay is a desalted organoclay (as described below), from 0.05 wt % to 25 wt % of the polymer nanocomposite, or both. Also preferably, the invention process further comprises a step of removing at least 90% or more, more preferably 95% or more, still more preferably 98% or more, even more preferably 99% or more of the swelling liquid from the polymer nanocomposite.

In a second embodiment, the instant invention is a polymer nanocomposite made by the invention process of the first embodiment.

The invention nanocomposites are useful, for example, as barrier films and foams, molded articles, and extruded articles, all of which may be prepared by conventional fabrication methods. The barrier films and foams and articles may be used, for example, to manufacture building materials, packaging materials, automotive parts, electronics devices, and computer housings.

Additional embodiments of the present invention are described in the following detailed description and claims.

BRIEF DESCRIPTION OF THE DRAWINGS

Figure (FIG.) 1 is a backscatter scanning electron microscope (SEM) image of the polypropylene nanocomposite of Example 5.

DETAILED DESCRIPTION OF THE INVENTION

Figure 1:
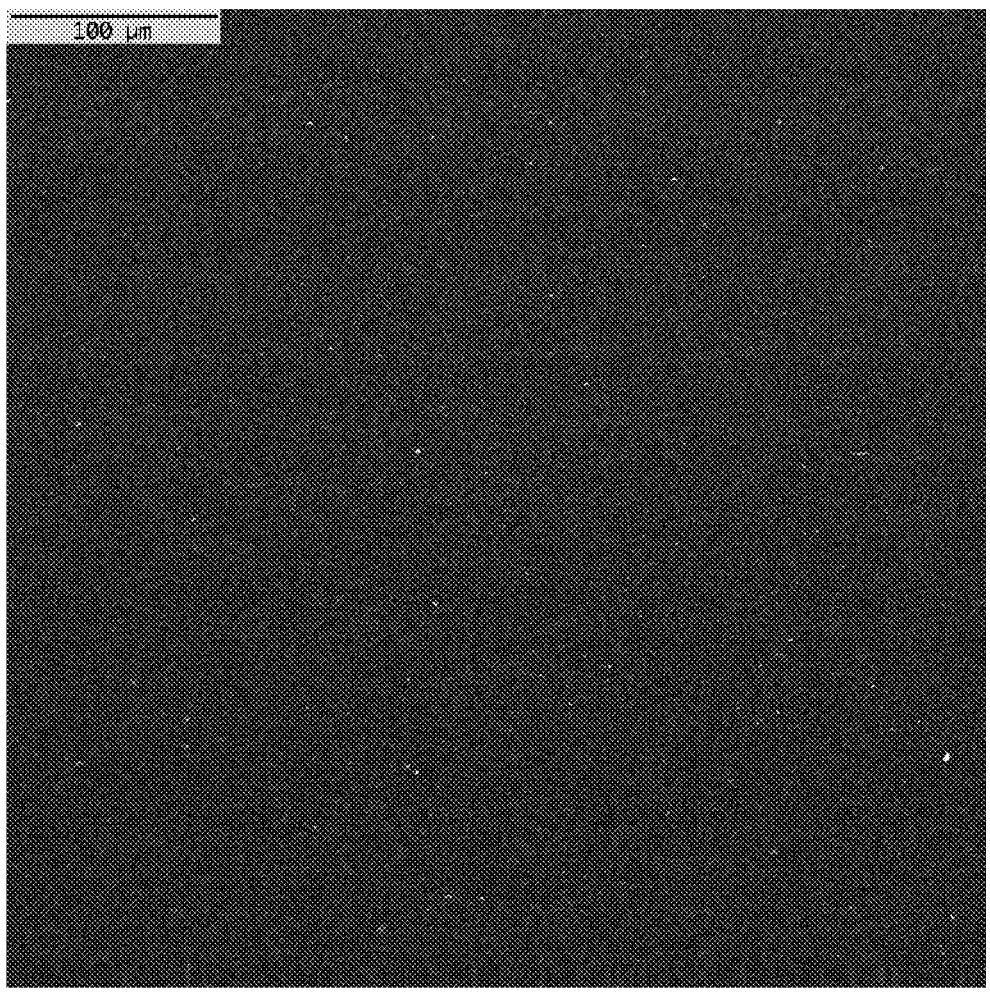

The instant invention provides a process of the first embodiment of making a polymer nanocomposite as described herein. In preferred embodiments, the invention process avoids drying, milling, and sieving of the organoclay or organosalt before compounding it with a polymer. Further, the invention process avoids drawbacks associated with organic solvents. The instant invention also provides a polymer nanocomposite of the second embodiment.

For purposes of United States patent practice and other patent practices allowing incorporation of subject matter by reference, and the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference, especially with respect to the disclosure of synthetic techniques, reaction conditions, and specifically named compounds. In an event where there is a conflict between what is written in the present specification and what is written in a patent, patent application, or patent application publication, or a portion thereof that is incorporated by reference, what is written in the present specification controls.

In the present application, any lower limit of a range, or any preferred lower limit of the range, may be combined with any upper limit of the range, or any preferred upper limit of the range, to define a preferred embodiment of the range.

In any embodiment described herein, the open-ended terms "comprising," "comprises," and the like (which are synonymous with "including," "having," and "characterized by") may be replaced by the respective partially closed phrases "consisting essentially of," consists essentially of," and the like or the respective closed phrases "consisting of," "consists of," and the like.

As used herein, the term "exfoliated" means, for present purposes, that the cation exchanging layered material is partially or fully delaminated such that at least 50% of particles thereof have at least one dimension that is less than 100 nm. Preferably, the cation exchanging layered material is delaminated into first components, each independently having one, two, three, four, five, six, seven, eight, nine, or ten layers of cation exchanging layered material and, optionally, second components, each independently having more than ten layers of cation exchanging layered material, the volume percent of all of the first components being greater than the volume percent of all of the second components upon examination by transmission electron microscopy of a representative sample of polymer nanocomposite. That is, the cation exchanging layered material need not be completely exfoliated into one-layer components, but may exist as a mixture of components having varying numbers of layers as described. In some embodiments, the cation exchanging layered material is delaminated into third components, each independently having one, two, three, four, or five layers and, optionally, fourth components, each independently having more than five layers of cation exchanging layered material, the volume percent of all of the third components being greater than the volume percent of all of the fourth components upon examination by transmission electron microscopy of a representative sample of the polymer nanocomposite.

The term "exfoliatably contacting" and phrase "under exfoliating conditions" are essentially synonymous and mean mixing an organoclay or organosalt capable of being exfoliated and at least one other component under conditions facilitating mechanical separation of at least some layers of the organoclay or organosalt, to produce a mixture, suspension, or distribution of an exfoliated organoclay or organosalt as defined above, wherein the mixture, suspension, or distribution is preferably characterized by a substantially uniform distribution of the organoclay or organosalt in the other component(s).

The term "cation exchanging layered material" means a substance derived from a swellable (using the swelling liquid useful in the present invention) inorganic solid (natural or synthetic) comprised of negatively-charged layers (also known as sheets or platelets) and having a cation exchanging capacity (which is substantially exchangeable in a swollen state). Cations balance (i.e., neutralize) the negative charge of the cation exchanging layered material.

The inorganic solid may be a swellable, natural or synthetic inorganic salt such as, for example, synthetic alpha-zirconium phosphate [$Zr(HPO_4)_2 \cdot H_2O$] or, preferably, the inorganic solid is a swellable, natural or synthetic inorganic clay. Examples of natural and synthetic inorganic clays are layered silicates (such as magadite and kenyaite), layered 2:1 silicates (such as natural and synthetic smectites, hormites, vermiculites, illites, micas, and chlorites), and sepiolites. Preferably, the cation exchanging layered material is derived from a montmorillonite, mica, fluoromica, sepiolite, nontronite, bentonite, kaolinite, beidellite, volkonskoite, hectorite, fluorohectorite, saponite, sauconite, stevensite, halloysite, magadite, medmontite, kenyaite, or vermiculite, or a mixture of two or more thereof. In some embodiments, the cation exchanging layered material is derived from montmorillonite, fluoromica, or sepiolite. More preferably, the cation exchanging layered material is derived from fluoromica.

The term "organosalt" means a less than fully exchanged substance comprising organic cations, inorganic cations, and a cation exchanging layered material, wherein the inorganic cations and the cation exchanging layered material are derived from a natural or synthetic inorganic salt. The organosalt useful in the present invention may be prepared from an inorganic salt by exchanging some, but not all, inorganic cations of the inorganic salt for organic cations.

The term "organoclay" means a less than fully exchanged substance comprising organic cations, inorganic cations, and a cation exchanging layered material, wherein the inorganic cations and cation exchanging layered material are derived from a natural or synthetic inorganic clay. The organoclay useful in the present invention may be prepared from an inorganic clay by exchanging some, but not all, inorganic cations of the inorganic clay for organic cations. The term "desalted organoclay" means an organoclay wherefrom most of the salts comprising the exchangeable cations and counter anions are removed.

The cation exchanging layered material of the organosalt or organoclay is less than fully (i.e., less than 100%) exchanged, which means it has unused cation exchanging capacity, i.e., the inorganic cations are less than fully exchanged with the organic cations (i.e., some inorganic cations remain in the organoclay or organosalt) such that the organosalt or organoclay also contains said inorganic cations. Preferably, the cation exchanging capacity is from 40% to 99% exchanged with the organic cations, leaving respectively from 60% to 1% of unused cation exchanging capacity. More preferably, at least 10%, still more preferably at least 20%, even more preferably at least 25% of the cation exchanging capacity is unused. In some embodiments, the cation exchanging capacity of the cation exchanging layered material is 40% or more, preferably 50% or more; more preferably 55% or more, still more preferably 60% or more; and 99% or less, preferably 90% or less, more preferably 80% or less, still more preferably 75% or less, even more preferably 70% or less exchanged with (i.e., replaced by) the organic cation material. Preferably, the cation exchanging capacity of the cation exchanging layered material of montmorillonite, fluoromica, and sepiolite independently is in the range of from 50% to 80% exchanged with an organic cation material, more preferably with a quaternary ammonium.

The term "cation exchange capacity" of a cation exchanging layered material represents an amount of a set of exchangeable cations and describes a capability to replace one set of exchangeable cations (typically a capability to replace inorganic ions such as sodium cation ($Na^+$), calcium cation ($Ca^{+2}$) or hydrogen cation ($H^+$)) with another set of cations (either inorganic or, preferably, organic). Organic cations are derived from an organic cation exchange material, which is described below. The term "exchangeable cations" means monovalent cations, polyvalent cations, or a mixture thereof, each cation having a formal positive charge.

In some embodiments of the present invention, the cation exchange capacity of an inorganic salt or inorganic clay is measured in order to determine the number of moles of organic cation exchange material to add thereto for preparation of an organosalt or organoclay useful in the present invention. For example, the cation exchange capacity of the inorganic clay can be measured by several methods, most of which perform an actual exchange reaction and analyze the product for the presence of each of the exchanging ions. Thus, the stoichiometry of exchange can be determined on a mole percent basis. Alternatively, the cation exchange capacity of commercially available inorganic clays may be provided by their commercial suppliers.

While the particular method used to measure the cation exchange capacity of the inorganic clay is not important to the present invention, preferably, the cation exchange capacity of the inorganic clay may be measured using the procedure described on page 155 of *Composition and Properties of Oil Well Drilling Fluids*, $4^{th}$ edition, George R. Gray and H. C. H. Darley, 1980, Gulf Publish Company, Houston, Tex., USA. One method of Gray and Darley involves leaching a first sample of an inorganic clay with excess of a suitable salt such as, for example, ammonium acetate to provide a first filtrate and leaching a second sample of the inorganic clay with water to provide a second filtrate. Separately analyzing the first and second filtrates for common exchange cations by conventional means provides the milliequivalents (mEQ, defined below) of each species of cation adsorbed on the clay and the total mEQ, i.e., cation exchange capacity, of all species of cations. The term "milliequivalents" (mEQ) equals millimole equivalents of cation exchange capacity; for example, 125 mEQ means 0.125 moles of cation exchange capacity.

An inorganic cation exchanging layered material useful in the present invention (e.g., a silicate clay or 2:1 silicate clay in its natural state or washed with purified water) preferably has a negative charge on its surface of at least 20 mEQ, more preferably at least 50 mEQ, and preferably 200 mEQ or less, more preferably 150 mEQ or less, still more preferably 125 mEQ or less, per 100 grams (g) of the material.

The term "organic cation material" means a substance comprising organic cations and their associated counter anions. The term "organic cations" means a cation that comprises at least one hydrocarbyl radical covalently bonded to a cation functionality. The organic cations may be the same or different. The cation functionality preferably comprises a nitrogen, phosphorous, sulfur, oxygen, or arsenic atom having a formal charge of +1. More preferably, the cation functionality comprises a nitrogen, phosphorous, or sulfur atom, still more preferably a nitrogen atom, having a formal charge of +1.

The term "hydrocarbyl" means a univalent hydrocarbon radical of from 1 to 100 carbon atoms, wherein the radical is formally formed by removing a hydrogen atom from a hydrocarbon. Preferably, each hydrocarbon radical independently is aromatic or non-aromatic, saturated or unsaturated, straight chain or branched chain, cyclic (including mono- and polycyclic, fused and non-fused polycyclic) or acyclic, or a combination of two or more thereof. Preferably, each hydrocarbyl independently is a ($C_1$-$C_{100}$)alkyl, ($C_3$-$C_{100}$)cycloalkyl, or ($C_3$-$C_{50}$)cycloalkyl-($C_1$-$C_{50}$)alkylene. The term "($C_1$-$C_{100}$) alkyl" means a saturated straight or branched hydrocarbon radical of from 1 to 100 carbon atoms. The term "($C_1$-$C_{50}$) alkylene" means a saturated straight or branched chain diradical of from 1 to 50 carbon atoms. The term "($C_3$-$C_{100}$)cycloalkyl" means a saturated cyclic hydrocarbon radical of from 3 to 100 carbon atoms. More preferably, each hydrocarbyl comprises from 1 to 40 carbon atoms, still more preferably from 1 to 20 carbon atoms. When there are two or more hydrocarbyl groups, preferably at least one hydrocarbyl comprises 10 or more carbon atoms.

In some embodiments, the organic cations are "onium" ions. Examples of onium organic cations are phosphonium, arsonium, sulfonium, oxonium, imidazolium, benzimidazolium, imidazolinium, quaternary ammonium (e.g., $R^1R^2R^3R^4N^+$ wherein each of $R^1$, $R^2$, $R^3$, and $R^4$ independently is a hydrocarbyl of from 1 to 100 carbon atoms, and preferably at least one of $R^1$, $R^2$, $R^3$, and $R^4$ contains 10 or more carbon atoms), protonated amine (e.g., $N(H)_4^+$, $R^1N(H)_3^+$, $R^1R^2N(H)_2^+$, and $R^1R^2R^3N(H)^+$), protonated amine oxide, protonated betaine, pyridinium, anilinium, pyrrolium, piperidinium, pyrazolium, quinolinium, isoquinolinium, indolium, oxazolium, benzoxazolium, and quinuclidinium, and a combination of two or more thereof A typical example of an onium organic cation is a quaternary ammonium compound of the formula $R^1R^2R^3R^4N^+$. Other examples of organic cations are the onium compounds, amphoteric surface-active agents, choline compounds, and organosilane compounds described in U.S. Pat. No. 6,156,835, at column 6, line 32, to column 7, line 11; and the organophosphonium compounds described in U.S. Pat. No. 5,962,553, at column 3, lines 29 to 44, and preparations of organoclays therewith described at column 3, line 45, to column 4, line 23; wherefrom only column 6, line 32, to column 7, line 11, of U.S. Pat. No. 6,156,835 and only column 3, line 29, to column 4, line 23, of U.S. Pat. No. 5,962,553 are incorporated herein by reference. In some embodiments, the organic cation consists essentially of a diethoxy methyl $(C_1-C_{100})$alkyl quaternary ammonium wherein the $(C_1-C_{100})$alkyl group has from 12 to 18 carbon atoms. In other embodiments, the organic cation is a dimethyl di$((C_1-C_{100})$alkyl) quaternary ammonium.

The organic cation material used to make the organoclay or organosalt useful in the present invention may comprise a mixture of two or more different organic cations such as a mixture of quaternary ammonium cations, a mixture of quaternary ammonium cations and protonated amines, and a mixture of quaternary ammonium cations and alkoxy silyl alkyl amines. The presence of free amino groups (i.e., formally neutral amino nitrogen atoms) on the quaternary ammonium cation is also contemplated. Protonated amines may be prepared, for example and without limitation thereto, by the contact of the cation exchanging layered material with an acid followed by contact of the cation exchanging layered material with ammonia or an organic amine (e.g., $R^1N(H)_2$, $R^1R^2NH$, and $R^1R^2R^3N$) to protonate the ammonia or an organic amine.

In the mixture comprising an organoclay or organosalt and swelling liquid, preferably the swelling liquid comprises at least 30 wt %, more preferably at least 50 wt; and preferably less than 95 wt %, more preferably 90 wt % or less; still more preferably 85 wt % or less . The swelling liquid contains no more than 1 wt %, preferably no more than 0.1 wt %, more preferably no more than 0.01 wt %, still more preferably essentially 0 wt %, of a water-immiscible organic solvent. Preferably, the swelling liquid does not contain a water-immiscible organic solvent. More preferably, the swelling liquid consists essentially of water (i.e., there is essentially 0 wt % water-miscible organic solvent and 0 wt % water-immiscible organic solvent).

The term "purified water" means water that is essentially free of inorganic ions, especially inorganic cations. Examples of purified water are deionized water (also known as demineralized water) and distilled water. Salt removal may be determined by, for example, washing time, volume of wash water employed, or conductivity measurements of the wash water liquor.

The term "water-miscible organic solvent" means a solvent that is dissolvable in deionized water at 25 degrees Celsius (° C.) in any proportion to form a homogeneous mixture. Preferred water-miscible organic solvents are methanol, ethanol, 1-propanol, 2-propanol, acetone, acetonitrile, dimethylsulfoxide, formamide, N,N-dimethylformamide, formic acid, and acetic acid. Conversely, the term "water-immiscible organic solvent" means a solvent that is not dissolvable in deionized water at 25° C. in at least one proportion (i.e., forms a heterogeneous mixture in at least one proportion). Examples of water-immiscible organic solvents are tetrahydrofuran, ethyl acetate, ε-caprolactam, and diethylbenzenes.

In some embodiments, it may be advantageous to employ a devolatilizer (e.g., a devolatilizing extruder) to remove the swelling liquid from the invention polymer nanocomposite.

As mentioned before, preferably, the organoclay or organosalt is from 0.05 wt % to 25 wt % of the polymer nanocomposite. More preferably, the organoclay or organosalt is at least 0.5 wt %, still more preferably at least 1.0 wt %; and preferably less than 6 wt % of the polymer nanocomposite.

In preferred embodiments of the present invention, the invention process of the first embodiment further comprises a step of molding or extruding the invention polymer nanocomposite to respectively give a molded or extruded article or forming the invention polymer nanocomposite into a foam or film, wherein the article, foam, or film comprises the polymer nanocomposite. Thus, preferably the process of the first embodiment of the present invention premixes the mixture of an organoclay or organosalt and swelling liquid in the melt of the polymer in a first unit operation, manipulates the resulting distribution of the organoclay or organosalt in the melt into a shape in a second unit operation, and then allows the resulting shape to cool. In some embodiments, a third unit operation comprising actively cooling (e.g., via refrigerating the shape, contacting the shape with a chilled liquid or gas (e.g., a stream thereof), and the like) the resulting shape may be employed.

In some embodiments, it may be advantageous for the invention process to further employ a measured amount of one or more water miscible organic solvents, wherein the measured amount of the water miscible organic solvent is 10 wt % or less, more preferably less than 5 wt %, still more preferably less than 2 wt %, even more preferably less than 1 wt % of a combined weight of the water plus water miscible organic solvent. Preferably, the water miscible organic solvent has a boiling point of 150° C. or less. Examples of water miscible organic solvents are acetone, methanol, ethanol, and tetrahydrofuran.

Preferably, the invention process of the first embodiment does not employ any organic solvent (not counting residual organic solvent that may carry through from preparation of a polymer or organoclay or organosalt useful in the present invention). That is, preferably the swelling liquid consists essentially or entirely of water and excludes any added organic solvent. It has been found that the invention process employing a swelling liquid consisting essentially or entirely of water may be used to make an invention polymer nanocomposite as described herein even where the melt processable polymer may be characterized as being hydrophobic as described below.

Any type of melt processable polymer may be used in the present invention, including water immiscible polymers and water soluble polymers. When the polymer is a thermoplastic polymer, compounding may be done using an extruder. When the polymer is a thermoset polymer, compounding may done with a thermoset polymer component (such as the resin or hardener of an epoxy polymer) or with uncured thermoset polymer.

A melt processable polymer is capable of being compounded, e.g., distributably combined with an organoclay or organosalt useful in the present invention under exfoliating conditions and at a temperature above the polymer's glass transition temperature ($T_g$) or melt temperature ($T_m$), preferably whichever is higher, and upon cooling, forming an invention polymer nanocomposite. Preferably, the polymer will be combined with the organoclay or organosalt at a temperature that is at least 20° C., more preferably at least 30° C. above the polymer's $T_g$ or $T_m$, if any. Also, preferably the temperature will be at least 20° C., more preferably at least 30° C. above the invention polymer nanocomposite's $T_g$ or $T_m$, whichever is appropriate. For purposes herein, $T_g$ and $T_m$ are measured using differential scanning calorimetry by following ASTM standards E1356-91 or E794-85, respectively.

In some embodiments, the polymer and organoclay or organosalt are compounded at a temperature of 30° C. or higher and 350° C. or less, provided the temperature is above the polymer's glass transition temperature ($T_g$) or melt temperature ($T_m$), whichever is higher. In some embodiments, the polymer and organoclay or organosalt are compounded at a pressure of 0.1 atmosphere (ATM) to 1000 ATM.

Specific classes of polymers useful in the present invention are poly(phenylene ether ketones), polyamides, aliphatic polyketones, polyesters (e.g., poly(ethylene terephthalate), i.e., PET), polycarbonates, fluoroplastics, halogenated polyolefins, polystyrenes, polyolefins (e.g., polypropylenes and other poly(alpha-olefins), polyethylenes, and interpolymers thereof), and mixtures thereof. In a preferred embodiment, the polymer useful in the present invention is a poly(phenylene ether ketone), aliphatic polyketone, polyester (e.g., poly(ethylene terephthalate), i.e., PET), polycarbonate, fluoroplastic, halogenated polyolefin, polystyrene, polyolefin, polyethylene, interpolymer thereof, or a mixture thereof. In a more preferred embodiment, the polymer useful in the present invention is hydrophobic (e.g., a fluoroplastic, polyolefin, polystyrene, a halogenated polyolefin such as, for example, polyvinyl chloride and polyvinylidene chloride, or a mixture thereof).

The melt comprising a polymer may comprise one polymer or a mixture of two or more different polymers, and the polymer or mixture of polymers optionally may further consist essentially of one or more of the following optional ingredients: a ultraviolet light stabilizer, cross-linking agents, impact-modifying agent, compatiblizer, another polymer, resin, tackifier, filler, oil, flame retardant, antioxidant, processing aid, pigment, and dye. Preferred impact-modifying agents and compatibilizers are described in U.S. Pat. No. 6,423,768 B1, at column 5, line 56, to column 6, line 14, and at column 6, lines 15 to 59, respectively; wherefrom only column 5, line 56, to column 6, line 59, of are U.S. Pat. No. 6,423,768 B1 are incorporated herein by reference. Examples of impact-modifying agents are KRATON® (Shell Chemicals) rubber impact modifiers. Examples of compatiblizers are maleated compatibilizers (e.g., a Fusabond® MB 226 DE ("Maleated Compatibilizer 1"), E. I. duPont de Nemours and Company, or Polybond 3150 from Crompton Corp.).

In an invention process of the first embodiment, an invention polymer nanocomposite may be initially produced as a melt that solidifies upon cooling, evaporation of volatiles such as water, or a combination thereof.

Preferably, the invention polymer nanocomposite has at least one of an improved modulus, especially flexural modulus, Young's modulus, toughness (Izod) performance, heat resistance, chemical resistance, ignition resistance, resistance to diffusion of polar liquids or gases, yield strength, or dimensional stability compared to a same property of a comparator polymer composite made by a process comparable to the invention process of the first embodiment, except a mixture of the comparable process comprises from 0 wt % to 3 wt % water, more preferably from 0 wt % to 2 wt % water, still more preferably from 0 wt % to 1.0 wt %, even more preferably from 0 wt % to 0.2 wt % water. More preferably, the invention polymer nanocomposite has an improved flexural modulus and equal or improved toughness (Izod) performance.

In yet another aspect, the invention process of the first embodiment further comprises a process of making a mixture comprising an organoclay and a swelling liquid. In some embodiments, the process of making the mixture comprising an organoclay and a swelling liquid comprises the steps of: (a) mixing a swellable inorganic clay comprising a cation exchanging layered material and exchangeable inorganic cations and having a cation exchanging capacity, in a precursor liquid comprising water to give an aqueous mixture of a swollen inorganic clay, wherein compositions of the precursor liquid and the swelling liquid may be the same or different; (b) contacting an organic cation material, which comprises organic cations and counter anions, to the swollen inorganic clay to produce a preliminary mixture comprising the precursor liquid, salts comprising the exchangeable cations and counter anions, and an organoclay comprising the cation exchanging layered material and the organic cations, the cation exchanging capacity of the swellable inorganic clay being from 40% to 99% exchanged with the organic cations; and either (c1), where the precursor liquid and swelling liquid are different, washing the organoclay with a swelling liquid comprising more than 90 wt % of purified water and from 0 wt % to less than 10 wt % of a water-miscible organic solvent to give the mixture comprising an organoclay and a swelling liquid, wherein the organoclay is a desalted organoclay, the swelling liquid comprises from 25 wt % to less than 95 wt % of the mixture and the swelling liquid comprises more than 90 weight percent (wt %) water and from 0 wt % to less than 10 wt % of a water-miscible organic solvent, or (c2), where the precursor liquid and swelling liquid are the same, removing some of the precursor liquid from the preliminary mixture to give the mixture comprising the organoclay and water, wherein water comprises from 25 wt % to less than 95 wt % of the mixture. Preferably, the removing step (c2) comprises washing the organoclay with a swelling liquid comprising more than 90 wt % of purified water and from 0 wt % to less than 10 wt % of a water-miscible organic solvent to give a mixture comprising the organoclay and the swelling liquid, wherein the organoclay is desalted, the swelling liquid comprises from 25 wt % to less than 95 wt % of the mixture and the swelling liquid comprises more than 90 weight percent (wt %) water and from 0 wt % to less than 10 wt % of a water-miscible organic solvent. The precursor liquid and the swelling liquid are be different where, for example, the precursor liquid comprises less than 90 wt % water and a remainder that is a water-miscible organic solvent or the precursor liquid comprises more than 90 wt % water and a remainder that is a water-immiscible organic solvent.

While a mixture of an organoclay or organosalt and swelling liquid that is made by a process described herein may be dried to remove some or all of the swelling liquid (e.g., to reduce weight of the mixture for transportation), and the resulting dried organoclay or organosalt contacted with a swelling liquid useful in the present invention to reconstitute the mixture, preferably the mixture made by a process described herein is directly used (i.e., used without being dried and reconstituted) in an invention process of the first embodiment.

Removing liquid from a mixture comprising the liquid and a solid may be accomplished by any suitable operation and is generally known in the art. For example, it may comprise centrifuging, followed by decanting liquid, using a devolatilizer to evaporate liquid, washing away one liquid with another liquid, or filtering the solid.

In other embodiments, a mixture of organoclay or organosalt and water useful in the present invention may be prepared by hydrating a dry or insufficiently hydrated organoclay or organosalt (e.g., an organoclay comprising 3 wt % or less of water) by contacting the dry or insufficiently hydrated organoclay or organosalt to water, preferably liquid water, for a time until the mixture of organoclay or organosalt and water useful in the present invention is formed.

Mechanical Testing Protocols

Protocol 1: Sample Preparation

Cut injection-molded bars comprising a test material in half using a Hermes Table Shear to produce a test specimen having a gated end and a remaining end. Use the gated end of each test specimen for flexural testing. Use the remaining end of the bar to determine the izod impact strength of each sample.

Protocol 2: Flexural Modulus Test

Determine flex modulus of test materials using an Instron 55R4507 according to ASTM D790-03 (Procedure B, which is a standard testing procedure for CONTINUUM® DGDA-2490 NT (The Dow Chemical Company; "DGDA-2490 NT"). Conduct a 3-point test using a span of 2 inches (5.1 cm). Apply an initial load of 0.02 pounds (9 grams) and increase the load (crosshead speed) to deflect the sample at a rate of 0.5 inch/minute (0.13 cm/minute) to a maximum strain of 2.1%. Report data in kilopounds per square inch (ksi), wherein 1.0 ksi equals 68 atmospheres.

Protocol 3: Izod Impact Strength Test

Determine room temperature (73° F., 23° C.) izod impact strength of the samples using a Baldwin impact tester following ASTM D256. The notch radius is 0.01 inch (0.03 cm) with a 0.40 inch (1 cm) specimen width behind the notch. Use a 4-pound (1.8 kg) hammer with the friction and windage set at 0.035 and 0.015. Report data in foot-pounds per inch (ft-lb/in), wherein 1.00 ft-lb/in equals 0.534 joules per centimeter (J/cm).

PREPARATIONS

Preparation 1

Preparation of Water-wet Organoclay Filter Cake.

Prepare a water solution of 2 wt % sodium fluoromica clay (Somasif ME-100) in a vessel by vigorously mixing an appropriate amount of dry fluoromica clay powder into hot 80° C. deionized water. Allow the resulting mixture to cool and leave it undisturbed for 2 days, allowing any impurities and large particles to settle to the bottom of the vessel. Separate a clear top portion of the mixture to give the water solution of 2 wt % sodium fluoromica clay.

Separately, prepare a 3 wt % solution of ARQUAD™ 2HT (quat; dimethyl-di($C_{16}$-$C_{18}$)alkyl quaternary ammonium chloride, Akzo Nobel Chemicals B.V.) in ethanol. Separately preheat the water solution of 2 wt % fluoromica clay and ARQUAD™ 2HT/ethanol solution to 70° C., and combine the heated materials with appropriate flow rates in an Oakes reactor to give a suspension of fluoromica/ARQUAD™ 2HT organoclay with clay-to quat mole ratio of 1:0.7, wherein the mole ratio is based on number of moles of fluoromica clay, as determined by its formula weight, to number of moles of quat ion. Separate the organoclay from the liquor by vacuum filtration, and wash the resulting filtercake with fresh deionized water until most NaCl salt is removed, as monitored by measuring conductivity of separated liquor and washings, to give the title water-wet organoclay filter cake. Divide the resulting water-wet, organoclay filter cake into five equal portions of 85 g each.

Preparation 2

Preparation of Diethylbenzenes-wet Organoclay Filter Cake.

Separately wash two portions of the water-wet organoclay filter cakes of Preparation 1 three times with 150 mL of acetone each time, then once with diethylbenzenes to give two portions of the title diethylbenzenes-wet organoclay filter cake. (Diethylbenzenes means a mixture of 1,2-, 1,3-, and 1,4-regioisomers of diethylbenzene.)

Preparation 3

Preparation of Dry Organoclay

Dry one portion of the water-wet fluoromica/ARQUAD™ 2HT organoclay of Preparation 1 to a constant weight to give dry fluoromica/ARQUAD™ 2HT organoclay.

Preparation 4

Synthesis of Synthetic Alpha-zirconium Phosphate [$Zr(HPO_4)_2.H_2O$]

This preparation follows the method of Sun L., et al., supra. Reflux zirconyl chloride octahydrate ($ZrOCl_2.8H_2O$; Aldrich Chemical Company), phosphoric acid (EM Science), and hydrofluoric acid (EMD Chemicals) in a Teflon flask coupled with a Teflon condenser to give the alpha-zirconium phosphate [$Zr(HPO_4)_2.H_2O$] as a particulate solid.

Preparation 5

Preparation of an Organosalt Comprising Alpha-zirconium Phosphate

Exfoliate the alpha-zirconium phosphate of Preparation 4 by contacting it to tetra(1-butyl)ammonium hydroxide ($TBA^+O(H)^-$, Aldrich Chemical Company) in water (the resulting mixture is an aqueous dispersion) maintained at about 0° C. in an ice bath to minimize hydrolysis. Control the concentration of alpha-zirconium phosphate in the aqueous dispersion at a low molarity (M; preferably the molarity is about 0.0050 moles of alpha-zirconium phosphate per liter of dispersion, i.e., $5.0 \times 10^{-3}$ M) so that the dispersed alpha-zirconium phosphate is completely reacted with the $TBA^+O(H)^-$ to give the organosalt comprising alpha-zirconium phosphate, the organosalt comprising alpha-zirconium phosphate being intercalated with $TBA^+O(H)^-$ and exfoliated. The organosalt may be used directly in an invention process of the first embodiment. If desired, the organosalt may be characterized by X-ray diffraction (XRD) under both dry sample states (cast on a silicon wafer and dried overnight at room temperature)

and wet sample states (in aqueous dispersion). The wet samples may be characterized directly by forming a thin layer of liquid film on a silicon wafer and covering the film with a Mylar film (Complex Industries, Inc., Palm City, Fla.) to maintain a flat liquid surface and minimize evaporation during XRD experiments.

COMPARATIVE EXAMPLES

Comparative Example 1

Preparation of a Polyethylene Nanocomposite Comprising 97.8 wt % DGDA-2490 NT and 2.2 wt % of an Organoclay Combine the polyethylene polymer, DGDA-2490 NT, and a portion of the diethylbenzenes-wet organoclay filter cake of Preparation 2 in a Haake extruder to give the polymer nanocomposite of Comparative Example 1 comprising 97.8 wt % DGDA-2490 NT and 2.2 wt % of an organoclay. Prepare an injection molded bar from this nanocomposite and test for flexural modulus and Izod impact strength. Results are shown later in Table 1.

Comparative Example 2

Preparation of a Polyethylene Nanocomposite Comprising 97.8 wt % Polymer and 2.2 wt % of an Organoclay Combine a polymer comprising 92 wt % DGDA-2490 NT, and 8 wt % of Maleated Compatiblizer 1 (see above) with another portion of the diethylbenzenes-wet organoclay filter cake of Preparation 2 in a Haake extruder to give the polymer nanocomposite of Comparative Example 2 comprising 97.8 wt % polymer and 2.2 wt % of an organoclay. Prepare an injection molded bar from the nanocomposite of Comparative Example 2 and test it for flexural modulus and Izod impact strength. Results are also shown later in Table 1.

Results of relative percent improvement (+ %) or impairment (− %) of flexural modulus and Izod impact strength of the nanocomposites of Comparative Examples 1 and 2 and pristine DGDA-2490 NT polyethylene are also shown below in Table 1.

TABLE 1

Flexural modulus and Izod impact strength, and relative improvement or impairment thereof, of the injection molded bars of nanocomposites of Comparative Examples 1 and 2 compared to an injection molded bar of pristine DGDA-2490 NT polymer.

| Comparative Example Number | Method | 2.2 wt % Organoclay type | Flexural Modulus (ksi) | Relative Improvement (+ %) or Impairment (− %) of flexural modulus | Izod impact strength (ft-lb/in) | Relative Improvement (+ %) or Impairment (− %) of Izod impact strength |
|---|---|---|---|---|---|---|
| Pristine* | DGDA-2490 NT | None* | 140 ± 4 | 0% | 13 ± 2 | 0% |
| 1 | 316 g DGDA-2490 NT | Diethylbenzenes-wet | 181.7 ± 2.6 | +29.8% | 8.9 ± 0.622 | −31.5% |
| 2 | 290 g DGDA-2490 NT + 26 g compatibilizer | Diethylbenzenes-wet | 67 ± 1.9 | +19.3% | 12.6 ± 0.148 | −3% |

*Pristine and *None mean DGDA-2490 NT polyethylene only, i.e., no organoclay.

Comparative Example 3

Preparation of a Polyethylene Nanocomposite Comprising 95 wt % DGDA-2490 NT and 5 wt % of an Organoclay Combine 95 wt % DGDA-2490 NT and 5 wt % of a portion of the dry organoclay comprising fluoromica clay and ARQUAD™ 2HT of Preparation 3 to give the polymer nanocomposite of Comparative Example 3 comprising 95 wt % DGDA-2490 NT and 5 wt % of a dry organoclay. Prepare a compression molded bar from the nanocomposite of Comparative Example 3 and test it for flexural modulus and Izod impact strength. Results of relative percent improvement (+ %) or impairment (− %) of flexural modulus and Izod impact strength of the nanocomposite of Comparative Example 3 compared to baseline flexural modulus and Izod impact strength of a compression molded bar prepared from pristine DGDA-2490 NT polyethylene are shown below in Table 2.

TABLE 2

Relative Improvement or Impairment of Flexural modulus and Izod impact strength of the compression molded bar of nanocomposite of Comparative Example 3 compared to same for a compression molded bar of pristine DGDA-2490 NT polyethylene.

| Comparative Example Number | Method | 5 wt % Organoclay type | Flexural Modulus (ksi) | Relative Improvement (+ %) or Impairment (− %) of flexural modulus | Izod impact strength (ft-lb/in) | Relative Improvement (+ %) or Impairment (− %) of Izod impact strength |
|---|---|---|---|---|---|---|
| Pristine* | DGDA-2490 NT | None* | N/A[(4)] | 0% | N/A | 0 |
| 3 | DGDA-2490 NT | Dry | N/A | +16% | N/A | −76% |

*Pristine and *None mean DGDA-2490 NT polyethylene only, i.e., no organoclay;
[(4)]N/A means not available.

Comparative Example 4

Figure 2:
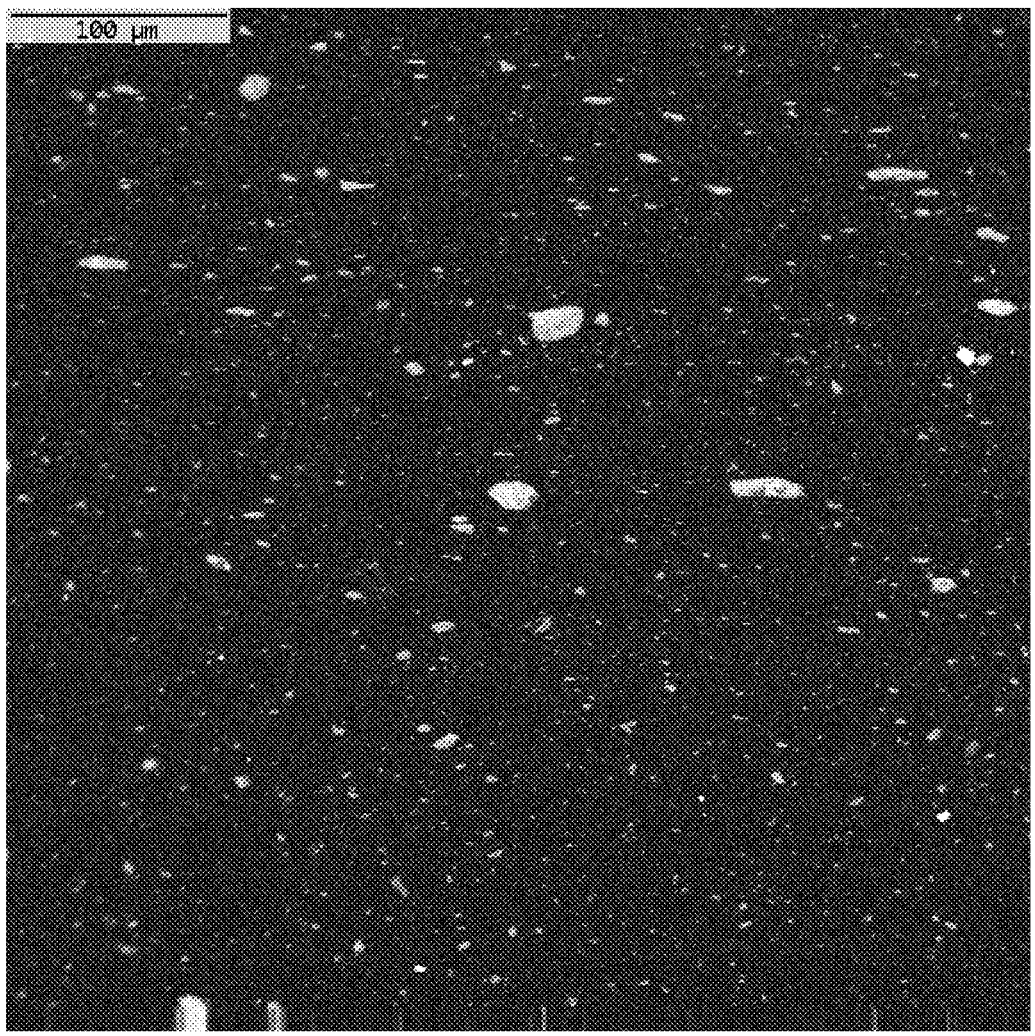
FIG. 2 is a backscatter SEM image of the polypropylene nanocomposite of Comparative Example 4.

Preparation of a Polypropylene Nanocomposite Comprising 95 wt % Polypropylene Polymer INSPIRE™ 112 (The Dow Chemical Company) and 5 wt % of an Organoclay Mix a polypropylene polymer INSPIRE™ 112 and a portion of the dry organoclay of Preparation 3 in a Haake extruder to give the polymer nanocomposite of Comparative Example 4 comprising 95 wt % polypropylene polymer INSPIRE™ 112 and 5 wt % of an organoclay. Prepare an injection molded bar from the nanocomposite of Comparative Example 4 and break it to give a freshly broken surface. Take a backscatter SEM image of the freshly broken surface. The SEM Image is shown in FIG. 2.

EXAMPLES OF THE PRESENT INVENTION

Examples 1 and 2

Preparation of Organoclay for Polyolefin Nanocomposites

Separately combine two portions of the water-wet filter cake of Preparation 1 with the amounts indicated in Table 1 of polyethylene polymer DGDA-2490 NT and Maleated Compatiblizer 1 to give nanocomposites. In Examples 1 and 2, use the clay filter cake as separated from water. Separately premix these organoclays with polymer powder and then feed the resulting mixture into a Haake extruder. Prepare injection molded bars of the polyolefin nanocomposites of Examples 1 and 2 and test them for flexural modulus and Izod impact strength. Results are shown later in Table 3.

Examples 3 and 4

Preparation of Organoclay for Polyolefin Nanocomposites

Repeat the experiments of Examples 1 and 2 using different batches of the water-wet filter cake of Preparation 1 with the modifications indicated below in Table 3 to give the polyolefin nanocomposites of Examples 3 and 4. Prepare injection molded bars of the polyolefin nanocomposites of Examples 3 and 4 and test them for flexural modulus and Izod impact strength. Results are also shown below in Table 3.

TABLE 3

Flexural modulus and Izod impact strength, and relative improvement or impairment thereof, of the injection molded bars of polyolefin nanocomposites of Examples 1 to 4 compared to an injection molded bar of pristine DGDA-2490 NT polymer.

| Example Number | Method | 2.2 wt % Organoclay type | Flexural Modulus (ksi) | Relative Improvement (+ %) or Impairment (− %) of flexural modulus | Izod impact strength (ft-lb/in) | Relative Improvement (+ %) or Impairment (− %) of Izod Impact Strength |
|---|---|---|---|---|---|---|
| Pristine* | DGDA-2490 NT | none | 140 ± 4 | 0% | 13 ± 2 | 0% |
| 1 | 316 g DGDA-2490 NT | Water-wet | 179.8 ± 1.2 | +28.4% | 8.44 ± 0.637 | −35% |
| 2 | 290 g DGDA-2490 NT + 26 g compatibilizer | Water-wet | 166.1 ± 2.5 | +18.6% | 14.1 ± 0.551 | +8.5% |
| 3 | 316 g DGDA-2490 NT | Water-wet | 177.3 ± 2.2 | +26.6% | 7.88 ± 0.117 | −39% |
| 4 | 290 g DGDA-2490 NT + 26 g compatibilizer | Water-wet | 168.5 ± 2.2 | +20.4% | 10.9 ± 0.344 | −16% |

*Pristine means DGDA-2490 NT polymer only, i.e., no organoclay.

Comparing the results in Tables 1 and 3 demonstrates that a water-wet organoclay may be used according to a method of the present invention to prepare polymer nanocomposites having flexural modulus and Izod impact strength mechanical properties approximately equivalent to those properties of polymer nanocomposites prepared using a conventional organic solvent-wet organoclay. Further, the presence of compatiblizer is not required for obtaining good clay distribution in polymer nanocomposites (and therefore flexural modulus improvement) when water-wet organoclay is used to prepare polymer nanocomposites according to a method of the present invention.

Also, the mechanical properties (flexural modulus and impact toughness) of the nanocomposites of Examples 1 to 4, made using water-wet or diethylbenzenes-wet organoclay, are also significantly better than the mechanical properties of the nanocomposite of Comparative Example 3, which is made using dry organoclay.

Example 5

Preparation of a Polypropylene Nanocomposite Comprising 95 wt % Polypropylene Polymer INSPIRE™ 112 (The Dow Chemical Company) and 5 wt % of an Organoclay Combine a polypropylene polymer INSPIRE™ 112 and a portion of the water-wet organoclay of Preparation 1 in a Haake extruder to give the polymer nanocomposite of Example 5 comprising 95 wt % polypropylene polymer INSPIRE™ 112 and 5 wt % of an organoclay. Prepare an injection molded bar from the nanocomposite of Example 5 and break it to give a freshly broken surface. Take a backscatter SEM image of the freshly broken surface. The SEM Image is shown in FIG. 1.

As shown by comparing FIGS. 1 and 2, the polypropylene nanocomposite of Comparative Example 4 prepared with dry organoclay (FIG. 2) contains large clay agglomerates (i.e., particles having dimensions 1000 nm or larger, whereas polypropylene nanocomposite of Example 5 (FIG. 1) lacks large clay agglomerates.

While the invention has been described above according to its preferred embodiments and examples of steps and elements thereof, it can be modified within the spirit and scope of this disclosure. This application is therefore intended to cover any variations, uses, or adaptations of the instant invention using the general principles disclosed herein. Further, this application is intended to cover such departures from the present disclosure as come within the known or customary practice in the art to which this invention pertains and which fall within the limits of the following claims.

What is claimed is:

1. A process of making a polymer nanocomposite, the process comprising the steps of: exfoliatably contacting a melt comprising a polymer to a mixture comprising an organoclay or organosalt and a swelling liquid, wherein the swelling liquid comprises from 25 wt % to less than 95 wt % of the mixture and the swelling liquid comprises more than 90 weight percent (wt %) water and from 0 wt % to less than 10 wt % of a water-miscible organic solvent, to provide a distribution of the organoclay or organosalt in the melt; and cooling the distribution to provide a polymer nanocomposite comprising the organoclay or organosalt and the polymer, the organoclay or organosalt comprising a cation exchanging layered material, organic cations, and inorganic cations, the cation exchanging layered material having a cation exchanging capacity that is from 40% to 99% exchanged with the organic cations, and the organoclay or organosalt, when distributed in the polymer, being exfoliated and having at least one dimension that is less than 100 nanometers (nm); the process further comprising a step of removing at least 90% of the swelling liquid from the polymer nanocomposite.

2. A process as in claim 1, the process further comprising a step of molding or extruding the polymer nanocomposite to respectively give a molded or extruded article or forming the polymer nanocomposite into a foam or film, wherein the article, foam, or film comprises the polymer nanocomposite.

3. A process as in claim 1, A process of making a polymer nanocomposite, the process comprising the steps of: (a) mixing an inorganic clay comprising a cation exchanging layered material and exchangeable inorganic cations and having a cation exchanging capacity, in a precursor liquid comprising water to give an aqueous mixture of a swollen inorganic clay, wherein compositions of the precursor liquid and the swelling liquid are the same; (b) contacting an organic cation material, which comprises organic cations and counter anions, to the swollen inorganic clay to produce a preliminary mixture comprising the precursor liquid, salts comprising the exchangeable cations and counter anions, and an organoclay comprising the cation exchanging layered material and the organic cations, the cation exchanging capacity of the inorganic clay being from 40% to 99% exchanged with the organic cations; and (c1) removing some of the precursor liquid from the preliminary mixture to give a mixture comprising the organoclay and water, wherein water comprises from 25 wt % to less than 95 wt % of the mixture; exfoliatably contacting a melt comprising a polymer to a mixture comprising an organoclay or organosalt and a swelling liquid, wherein the swelling liquid comprises from 25 wt % to less than 95 wt % of the mixture and the swelling liquid comprises more than 90 weight percent (wt %) water and from 0 wt % to less than 10 wt % of a water-miscible organic solvent, to provide a distribution of the organoclay or organosalt in the melt; and cooling the distribution to provide a polymer nanocomposite comprising the organoclay or organosalt and the polymer, the organoclay or organosalt comprising a cation exchanging layered material, organic cations, and inorganic cations, the cation exchanging layered material having a cation exchanging capacity that is from 40% to 99% exchanged with the organic cations, and the organoclay or organosalt, when distributed in the polymer, being exfoliated and having at least one dimension that is less than 100 nanometers (nm).

4. A process as in claim 3, wherein the step (c1) comprises washing the organoclay of step (c1) with a swelling liquid comprising more than 90 wt % of purified water and from 0 wt % to less than 10 wt % of a water-miscible organic solvent to give a mixture comprising the organoclay and the swelling liquid, wherein the organoclay is desalted, the swelling liquid comprises from 25 wt % to less than 95 wt % of the mixture and the swelling liquid comprises more than 90 weight percent (wt %) water and from 0 wt % to less than 10 wt % of a water-miscible organic solvent.

5. A process as in claim 1, the process further comprising the preliminary steps of: (a) mixing an inorganic clay comprising a cation exchanging layered material and exchangeable inorganic cations and having a cation exchanging capacity, in a precursor liquid comprising water comprising water to give an aqueous mixture of a swollen inorganic clay, wherein compositions of the precursor liquid and the swelling liquid are different; (b) contacting an organic cation material, which comprises organic cations and counter anions, to the swollen inorganic clay to produce a preliminary mixture comprising the precursor liquid, salts comprising the exchangeable cations and counter anions, and an organoclay comprising the cation exchanging layered material and the organic cations, the cation exchanging capacity of the inorganic clay being from 40% to 99% exchanged with the organic cations;

and (c2) washing the organoclay with a swelling liquid comprising more than 90 wt % of purified water and from 0 wt % to less than 10 wt % of a water-miscible organic solvent to give a mixture comprising an organoclay and a swelling liquid, wherein the swelling liquid comprises from 25 wt % to less than 95 wt % of the mixture and the swelling liquid comprises more than 90 weight percent (wt %) water and from 0 wt % to less than 10 wt % of a water-miscible organic solvent, wherein the organoclay is a desalted organoclay, wherefrom most of the salts comprising the exchangeable cations and counter anions are removed.

6. A process as in claim 1, wherein the organic cations comprise onium ions.

7. A process as in claim 6, wherein the onium ions comprise phosphonium, arsenium, sulfonium, oxonium, imidazolium, benzimidazolium, imidazolinium, quaternary ammonium, protonated amine, protonated amine oxide, protonated betaine, pyridinium, anilinium, pyrrolium, piperidinium, pyrazolium, quinolinium, isoqunolinium, indolium, oxazolium, benzoxazolium, or quinuclidinium ions, or a combination of two or more thereof.

8. A process as in claim 1, wherein the cation exchanging layered material is derived from a montmorillonite, mica, fluoromica, sepiolite, nontronite, bentonite, kaolinite, beidellite, volkonskonite, hectorite, fluorohectorite, saponite, sauconite, stevensite, halloysite, magadite, medmontite, kenyaite, or vermiculite, or a mixture of two or more thereof.

9. A process as in claim 8, wherein the cation exchanging layered material is derived from fluoromica.

10. A process as in claim 1, wherein the polymer is a thermoplastic polymer.

11. A process as in claim 1, wherein the polymer is a fluoroplastic, poly(phenylene ether ketone), aliphatic polyketone, polyester, polycarbonate, polystyrene, or polyolefin.

12. A process as in claim 1, wherein the polymer is a polyolefin, polystyrene, fluoroplastic, a halogenated polyvinyl polymer, or a mixture thereof.

13. A process as in claim 1, the cation exchanging capacity being from 50% to 80% exchanged with the organic cations.

14. A process as in claim 1, wherein the swelling liquid comprises more than 99 wt % water.

15. A polymer nanocomposite made by a process of claim 1.

16. A polymer nanocomposite as in claim 15, the organoclay being a desalted organoclay, from 0.05 wt % to 25 wt % of the polymer nanocomposite.

17. A polymer nanocomposite as in claim 16, the organoclay being from 0.5 wt % to 6 wt % of the polymer nanocomposite.

* * * * *